(12) United States Patent
Kim

(10) Patent No.: US 7,578,490 B2
(45) Date of Patent: Aug. 25, 2009

(54) STAND OF DISPLAY DEVICE

(75) Inventor: Mun Hwan Kim, Goomi-si (KR)

(73) Assignee: LG Electronics Inc., Seoul (KR)

( * ) Notice: Subject to any disclaimer, the term of this patent is extended or adjusted under 35 U.S.C. 154(b) by 86 days.

(21) Appl. No.: 11/492,953

(22) Filed: Jul. 26, 2006

(65) Prior Publication Data

US 2007/0194183 A1 Aug. 23, 2007

(30) Foreign Application Priority Data

Feb. 17, 2006 (KR) .................. 10-2006-0015877

(51) Int. Cl.
*A47F 5/00* (2006.01)
*F16M 11/00* (2006.01)
*F16M 13/00* (2006.01)

(52) U.S. Cl. ............... 248/281.11; 248/138; 248/278.1; 248/921; 248/923; 361/681; 361/682

(58) Field of Classification Search ................ 248/138, 248/278.1, 281.11, 921, 923; 361/681–682
See application file for complete search history.

(56) References Cited

U.S. PATENT DOCUMENTS

| | | | | | |
|---|---|---|---|---|---|
| 4,183,489 | A | * | 1/1980 | Copher et al. ............. | 248/278.1 |
| 4,568,052 | A | * | 2/1986 | Solomon et al. ......... | 248/281.11 |
| 4,682,749 | A | * | 7/1987 | Strater ..................... | 248/284.1 |
| 4,953,822 | A | * | 9/1990 | Sharber et al. ......... | 248/281.11 |
| 4,987,690 | A | * | 1/1991 | Aaldenberg et al. ........... | 40/341 |
| 5,668,570 | A | * | 9/1997 | Ditzik ........................ | 345/173 |
| 6,478,275 | B1 | * | 11/2002 | Huang ..................... | 248/284.1 |
| 6,550,734 | B1 | * | 4/2003 | Spadea .................. | 248/280.11 |
| 6,592,090 | B1 | * | 7/2003 | Li ............................. | 248/284.1 |
| 6,695,274 | B1 | * | 2/2004 | Chiu .......................... | 248/371 |
| 6,769,657 | B1 | * | 8/2004 | Huang ..................... | 248/278.1 |
| 6,863,252 | B2 | * | 3/2005 | Bosson ................... | 248/278.1 |
| 7,061,753 | B2 | * | 6/2006 | Michoux et al. ............ | 361/681 |
| 7,252,277 | B2 | * | 8/2007 | Sweere et al. ............... | 248/371 |
| 2004/0245419 | A1 | * | 12/2004 | Sweere et al. ............ | 248/276.1 |
| 2005/0230585 | A1 | * | 10/2005 | Hung ...................... | 248/278.1 |
| 2007/0001076 | A1 | * | 1/2007 | Asamarai et al. ....... | 248/281.11 |
| 2007/0047186 | A1 | * | 3/2007 | Jang ........................... | 361/681 |
| 2007/0058329 | A1 | * | 3/2007 | Ledbetter et al. ............ | 361/681 |

* cited by examiner

*Primary Examiner*—J. Allen Shriver, II
*Assistant Examiner*—Michael McDuffie
(74) *Attorney, Agent, or Firm*—Ked & Associates LLP

(57) ABSTRACT

There is provided a stand of a display device for allowing more convenient adjustment of the display device to various positions. The stand includes a base unit, a supporting unit formed on a rear surface of the display device, a first two-link hinge unit, and a second two-link hinge unit. The first two-link hinge unit is provided between the base unit and the supporting unit for allowing revolution of the display device around an imaginary axis perpendicular to the display device. The second two-link hinge unit is provided between the base unit and the supporting unit for allowing revolution of the display device around an imaginary axis defined in a horizontal direction of display device.

17 Claims, 6 Drawing Sheets

STAND OF DISPLAY DEVICE

BACKGROUND OF THE INVENTION

1. Field of the Invention

The present invention relates to a stand of a display device, and more particularly, to a stand of a display device that increases the number of degrees-of-freedom of the display device in translation and rotation so that a user can use the display device more conveniently.

2. Description of the Related Art

Generally, flat display devices such as plasma display panels (PDPs) and liquid crystal displays (LCDs) are placed on a floor using a stand installed on a lower portion of the flat display devices. The stand supports the display device when the display device is put on a floor and provides a vertically adjustable mechanism such that a user can move the display device in a vertical direction for adjusting the height of display device screen. That is, a user, if necessary, can move up or down the display device to adjust the screen of the display device to a desired height.

In the related art, a typical stand used for adjusting the screen of a display device to a desired height includes a supporting unit installed on a rear side of the display device for supporting the display device, a slide assembly for moving the display device connected to the supporting unit, and a base unit connected to the slide assembly for supporting the display device with respect to a floor.

In the stand of the display device of the related art, the slide assembly connected to the supporting unit is moved up or down when a user moves up or down the display device for adjusting the height of the display device, so that the height of the display device can be adjusted to a desired level.

However, although the height of the display device can be adjusted by the vertical sliding of the slide assembly of the stand, the distance between a user and the display device and the tilting angle of the display device cannot be adjusted using the stand.

Meanwhile, in the related art, the tilting angle of the display device can be adjusted using another type of stand. However, in this case, the display device cannot be moved up and down.

Further, although the display device can be rotated using a further another type of stand, the display device cannot be translated and rotated at the same time. That is, the display device cannot have a sufficient number of degrees-of-freedom using the stand of the related.

SUMMARY OF THE INVENTION

Accordingly, the present invention is directed to a stand of a display device that substantially obviates one or more problems due to limitations and disadvantages of the related art.

An object of the present invention is to provide a stand of a display device, the stand allowing convenient and simultaneous adjustment of the display device to a desired height, desired distance from a user, desired tilting angle, and position.

Another object of the present invention is to provide a stand of a display device, the stand allowing convenient adjustment of the display device to a desired position and tilting angle, and allowing the display device to be conveniently moved in the adjusted position and tilting angle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand of a display device, the stand including: a base unit; a supporting unit formed on a rear surface of the display device; a first two-link hinge unit provided between the base unit and the supporting unit for allowing revolution of the display device around an imaginary axis perpendicular to the display device; and a second two-link hinge unit provided between the base unit and the supporting unit for allowing revolution of the display device around an imaginary axis defined in a horizontal direction of display device.

In another aspect of the present invention, there is provided a stand of a display device, the stand including: a base unit; a supporting unit formed on a rear surface of the display device; a first two-link hinge unit having an end rotatably connected to the supporting unit for allowing adjustment of the display device in left, right, up and down directions; and a second two-link hinge unit having one end rotatably connected to the first two-link hinge unit and the other end rotatably connected to the base unit.

In a further another aspect of the present invention, there is provided a stand of a display device, the stand including: a base unit; a first two-link hinge unit provided with a four-bar linkage structure and having an end connected to the display device, for allowing adjustment of the display device in left, right, up, and down directions; a second two-link hinge unit provided with a four-bar linkage structure and having an end connected to the base unit, for allowing adjustment of the display device in front, back, up, and down directions; and a tilting connection unit connected between the first and the second two-link hinge units for allowing adjustment of the display device to a desired tilting angle.

With above-described configuration, the stand of the present invention allows simultaneous and convenient adjustment of the display device to a desired height, distance from a user, and tilting angle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
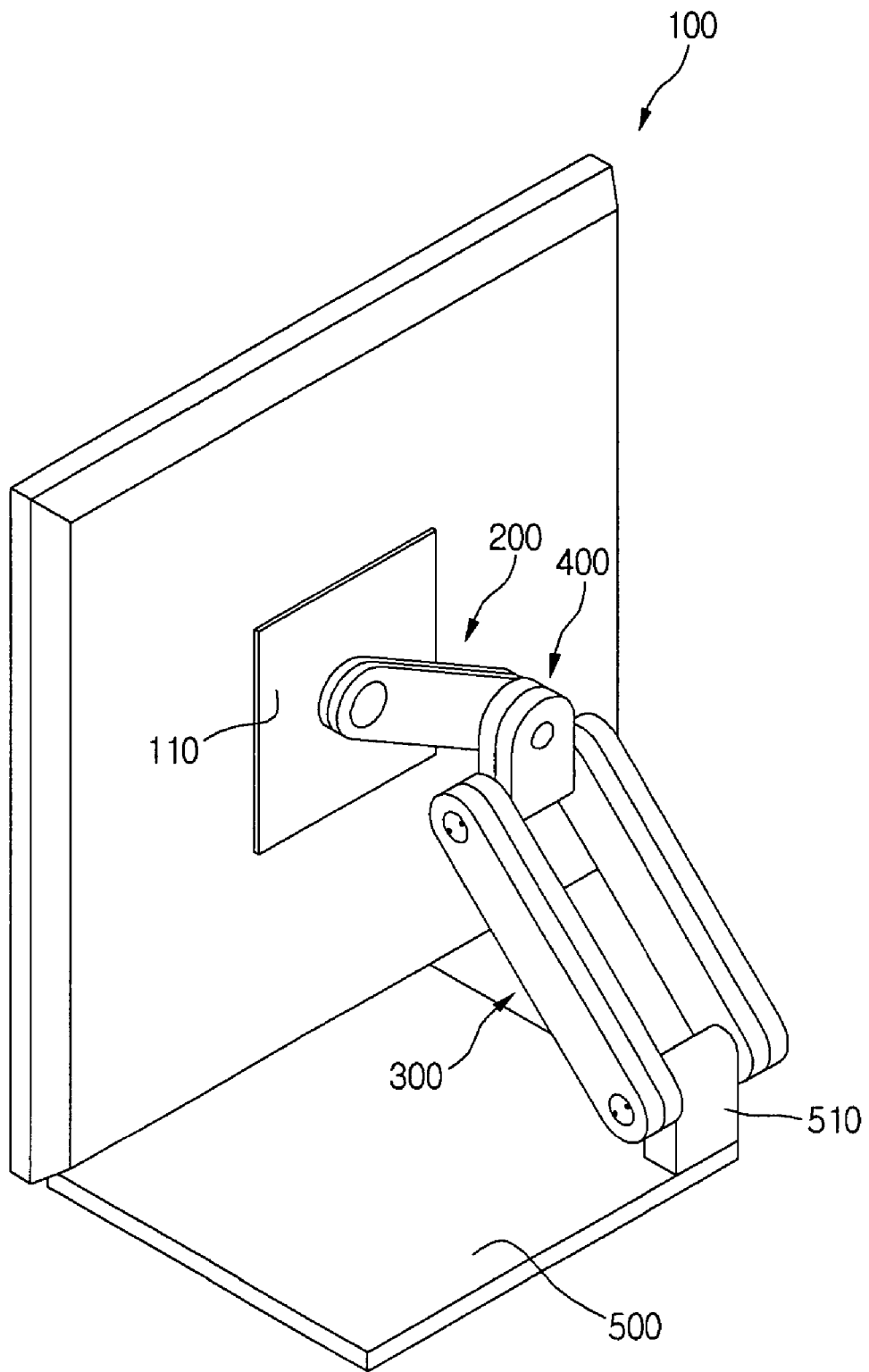
FIG. 1 is a rear perspective view of a display device with a stand according to the present invention.

FIG. 1 is a rear perspective view of a display device with a stand according to the present invention.

Referring to FIG. 1, according to an embodiment of the present invention, a stand of a display device includes a base unit 500 placed on a floor for supporting a display device 100 with respect to the floor, a first two-link hinge unit 200 having one end rotatably coupled to the display device 100, and a second two-link hinge unit 300 having one end rotatably coupled to the first two-link hinge unit 200 and the other end rotatably coupled to the base unit 500. The stand further includes a tilting connection unit 400 between the first two-link hinge unit 200 and the second two-link hinge unit 300 for adjusting a screen of the display device 100 to a desired tiling angle.

In other words, the stand includes a supporting member 110 fixed to a rear surface of the display device 100, the first two-link hinge unit 200 rotatably coupled to the supporting member 110, the second two-link hinge unit 300 rotatably connected to the first two-link hinge unit 200, and the base unit 500 having a protruded base fixing portion 510 to which the second two-link hinge unit 300 is rotatably coupled.

The base fixing portion 510 is formed on a corner of the base unit 500, and the first two-link hinge unit 200 and the second two-link hinge unit 300 extend from the base fixing portion 510 toward the inside of the base unit 500, such that the weight of the display device 100 can be stably supported by the base unit 500. If the base fixing portion 510 is not formed on a corner of the base unit 500, the base unit 500 must be broadened much more to support the display device 100 stably. Therefore, the base fixing portion 510 is formed on the corner of the base unit 500 to reduce the size of the base unit 500. Preferably, the base fixing portion 510 may be formed on a rear corner of the base unit 500.

The first two-link hinge unit 200 is rotatably connected to the supporting member 110 fixed to the rear surface of the display device 100, such that a user can adjust the position of the display device 100 in a vertical direction and a horizontal direction at the same time.

The second two-link hinge unit 300 has one end rotatably coupled to the first two-link hinge unit 200 and the other end rotatably coupled to the base fixing portion 510 of the base unit 500, such that a user can adjust the position of the display device 100 in a vertical direction and a front-to-back direction at the same time.

Meanwhile, the first two-link unit 200 and the second two-link unit 300 are connected using the tilting connection unit 400 such that a user can adjust the screen of the display device 100 to a desired titling angle.

In the above-described structure of the stand, the first two-link hinge unit 200 allows a user to adjust the position of the display device 100 in a horizontal direction and a vertical direction, and the second two-link hinge unit 300 allows a user to adjust the position of the display device 100 in a vertical direction and a front-to-back direction. Further, the tilting connection unit 400 allows a user to adjust the screen of the display device 100 to a desired tilting angle. Therefore, a user can adjust the height of the display device 100, the distance between the user and the display device 100, and the tilting angle of the display device screen at the same time. Furthermore, if an additional rotation hinge is provided between the supporting member 110 and the first two-link hinge unit 200, the display device 100 itself can rotate on the additional hinge unit, such that a user can use the display device 100 in portrait mode.

The first two-link hinge unit 200 gives first rotational degrees-of-freedom to the display device 100, allowing revolution of the display device 100 around an imaginary axis perpendicular to the rear surface of the display device 100. The second two-link hinge unit 300 gives second rotational degrees-of-freedom to the display device 100, allowing revolution of the display device 100 around an imaginary axis penetrating the display device 100 in a horizontal direction. The tilting connection unit 400 gives third degrees-of-freedom to the display device 100, allowing rotation of the display device 100 on an imaginary axis penetrating the display device 100 in a horizontal direction.

Owing to the four-bar linkages, namely quadric crank mechanism, provided in the first and second two-link hinge units 200 and 300, the orientation of the screen of the display device 100 does not substantially change with respect to a user when the display device 100 is translated/rotated. When one end of the four-bar linkage is moved, the extending direction of the one end is maintained substantially the same as the other end of the four-bar linkage. This structure will be easily understood by those of skill in the related art.

Owing to the four-bar linkages, namely quadric crank mechanism, provided in the first and second two-link hinge units 200 and 300, the orientation of the screen of the display device 100 does not substantially changed with respect to a user when the display device 100 is translated/rotated. When one end of the four-bar linkage is moved, the extending direction of the one end is maintained substantially the same as the other end of the four-bar linkage. This structure will be easily understood by those of skill in the related art.

Hereinafter, the stand of the display device will now be more fully described according to preferred embodiments of the present invention.

Figure 2:
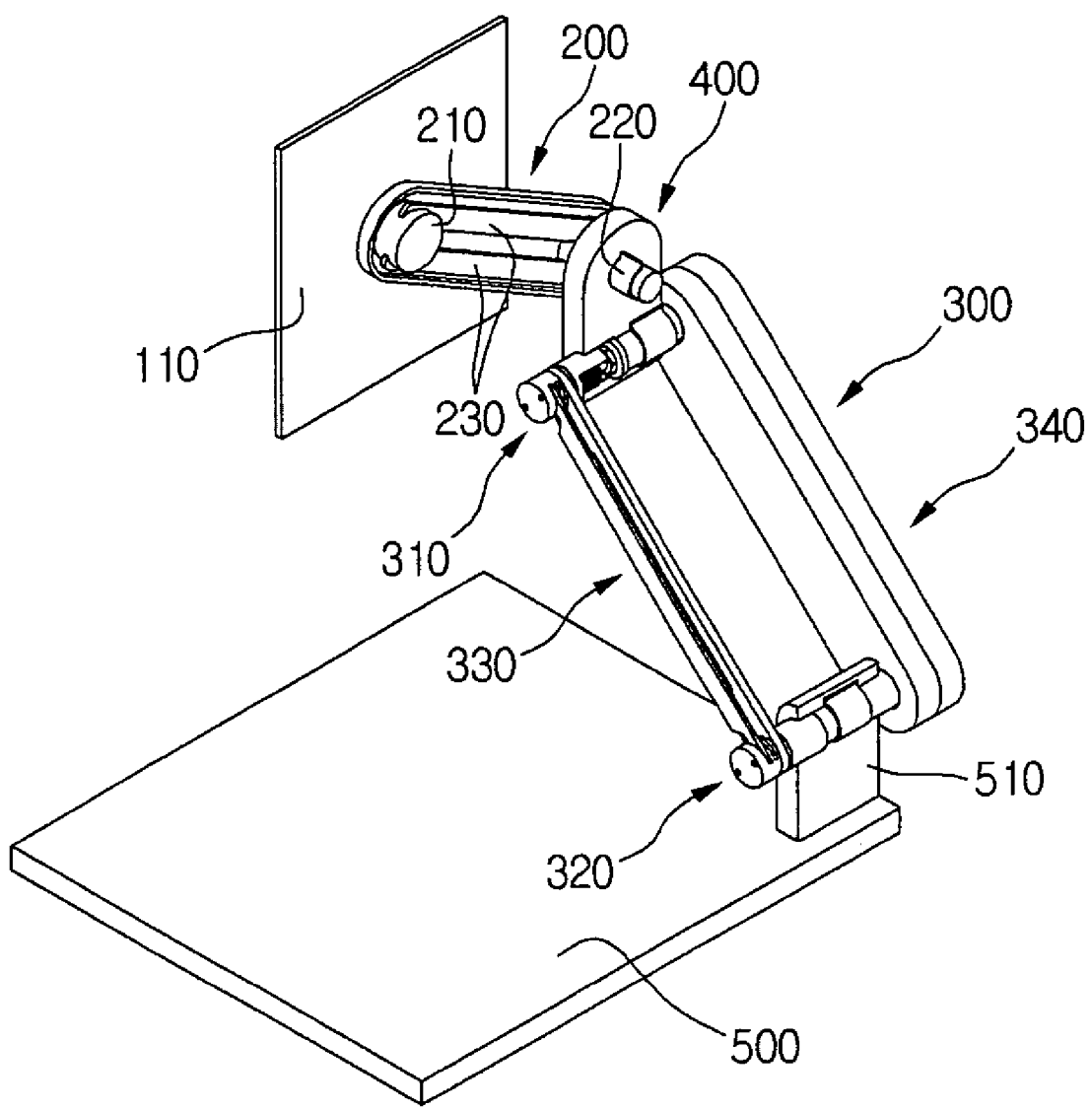
FIG. 2 illustrates an inner structure of a stand of a display device according to an embodiment of the present invention.
Figure 3:
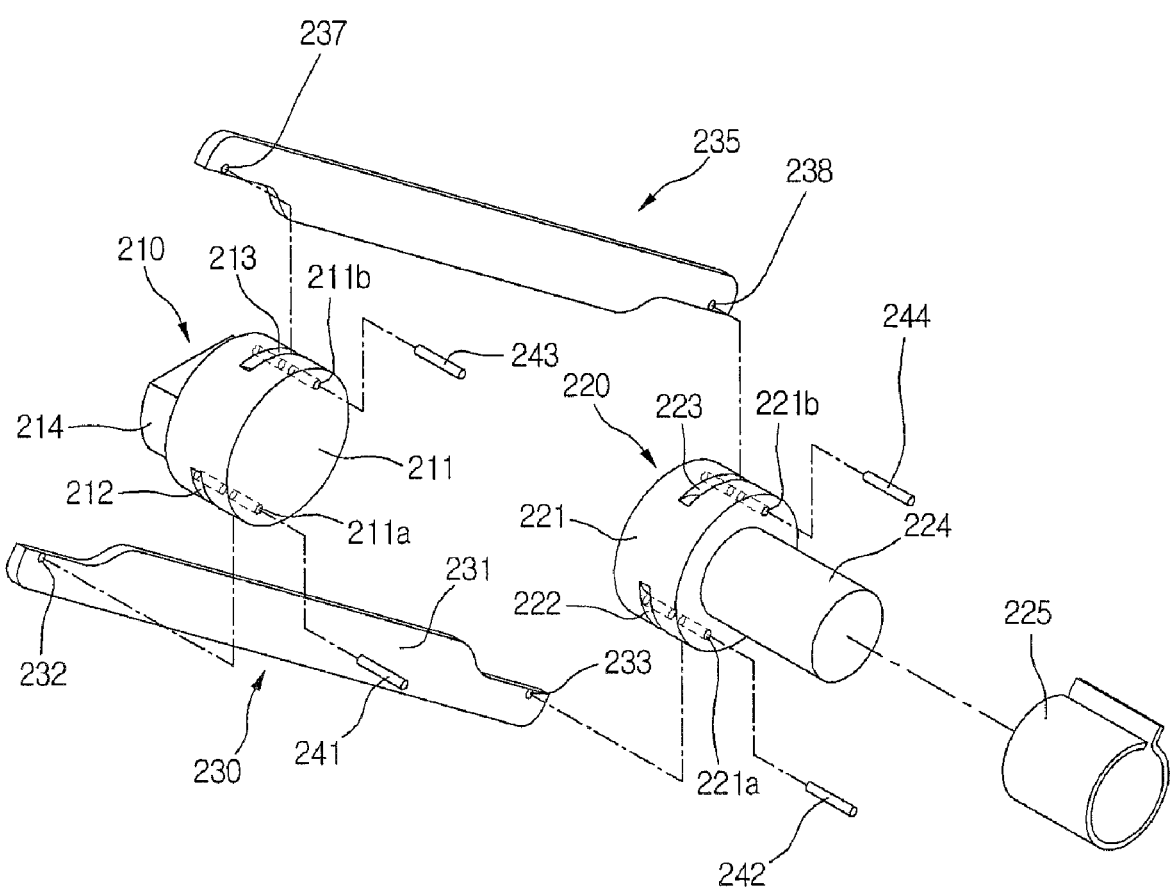
FIG. 3 is an exploded perspective view illustrating a first two-link hinge unit of a stand of a display device according to an embodiment of the present invention.
Figure 4:
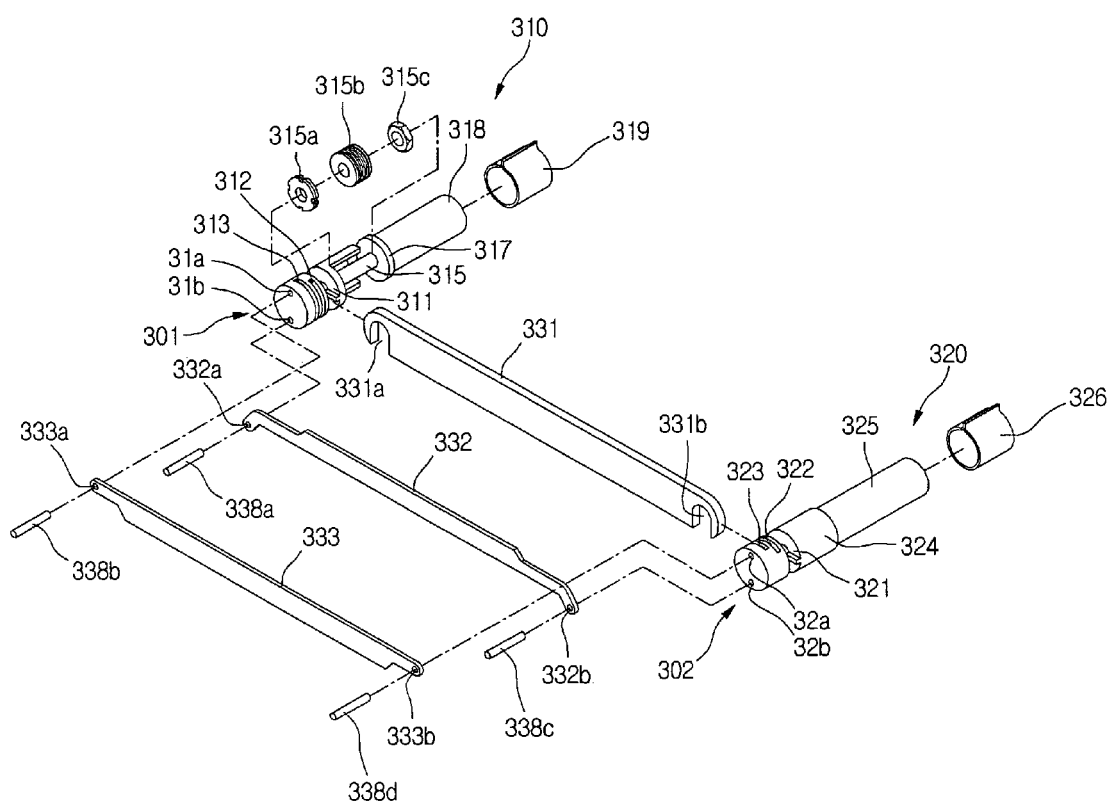
FIG. 4 is an exploded perspective view showing a second two-link hinge unit of a stand of a display device according to an embodiment of the present invention.

FIG. 2 illustrates an inner structure of a stand of a display device according to an embodiment of the present invention, FIG. 3 is an exploded perspective view illustrating a first two-link hinge unit 200 of the stand of depicted in FIG. 2, and FIG. 4 is an exploded perspective view showing a second two-link hinge unit 300 of the stand depicted in FIG. 2.

First, the structure and operation of the first two-link hinge unit 200 will now be described in detail. Referring to FIG. 2, the first two-link hinge unit 200 includes a first hinge part 210 rotatably coupled to a supporting member 110 that supports the display device 100, a second hinge part 220 rotatably coupled to a tilting connection unit 400, and a link part 230 rotatably connected between the first hinge part 210 and the second hinge part 220.

In detail, referring to FIG. 3, the first hinge part 210 includes a first hinge shaft 211 having a cylindrical shape, and a left link receiving portion 212 and a right link receiving portion 213 that are recessed in an outer surface of the first hinge shaft 211 to receive one end of the link part 230. The first hinge shaft 211 includes through-holes 211a and 211b in a right end when viewed in FIG. 3. The through-holes 211a and 211b are communicated with the left link receiving portion 212 and the right link receiving portion 213, respectively. The first hinge shaft 211 further includes a supporting member connecting axle 214 for coupling with the supporting member 110 fixed to a rear surface of the display device 100.

The second hinge part 220 includes a second hinge shaft 221 having a cylindrical shape, and a left link receiving portion 222 and a right link receiving portion 223 that are recessed in an outer surface of the second hinge shaft 221 to receive the other end of the link part 230. The second hinge shaft 221 includes an extension 224 protruded from the second hinge shaft 221 away from the rear surface of the display device 100 for being rotatably coupled to the second two-link hinge unit 300. When assembled, a second friction spring 225 having a hollow cylindrical shape is fitted around the extension 224 of the second hinge shaft 221. The second friction spring 225 includes a stopping jaw protruded outwardly. The second friction spring 225 enables the rotatable coupling with adequate friction force between the second hinge shaft 221 and the second two-link hinge unit 300.

The link part 230 includes a left link 231 and right link 235. Each of the left and right links 231 and 235 has a convex center portion and narrow end portions. The left link 231 and the right link 235 include fixing holes 232, 233, 237, and 238 in both ends for coupling with the first hinge shaft 211 of the first hinge part 210 and the second hinge shaft 221 of the second hinge part 220. One end of the left link 231 is inserted into the left link receiving portion 212 formed in the first hinge shaft 211 of the first hinge part 210, and the other end is inserted into the left link receiving portion 222 formed in the second hinge shaft 221 of the second hinge part 220. One end of the right link 235 is inserted into the right link receiving portion 213 formed in the first hinge shaft 211 of the first hinge part 210, and the other end is inserted into the right link receiving portion 223 formed in the second hinge shaft 221 of the second hinge part 220.

In detail, one end of the left link 231 and the right link 235 are inserted into the first hinge shaft 211 of the first hinge part 210, and the fixing holes 232 and 237 formed in the one end are aligned with the through-holes 211a and 211b formed in the right end of the shaft 211. Further, the other end of the left link 231 and the right link 235 are inserted into the hinge shaft 222 of the second hinge part 220, and the fixing holes 233 and 238 formed in the other end are aligned with through-holes 221a and 221b formed in a right end of the second hinge shaft 221.

After that, a plurality of fixing pins 241, 242, 243, and 244 are inserted into the through-holes 211a, 211b, 221a, and 221b of the hinge shafts 211 and 221 and into the fixing holes 232, 233, 237, and 238 of the left and right links 231 and 235, such that the left and right links 231 and 235 can be completely coupled to the first hinge shaft 211 of the first hinge part 210 and the second hinge shaft 221 of the second hinge part 220. In this structure, the first two-link hinge unit 200 can be rotated on the second hinge shaft 221 of the second hinge part 220. Therefore, the position of the display device 100 can be adjusted in a horizontal direction and a vertical direction.

As described above, in the first two-link hinge unit 200, the left link 231, the right link 235, the first hinge part 210, and the second hinge part 220 are connected to each other. Therefore, it is apparent that the first two-link hinge unit 200 has a four-bar linkage structure and operates as a four-bar linkage, namely quadric crank mechanism. Thus, even when the first hinge part 210 is moved by a force acting on the display device 100, the first hinge part 210 can maintain the same tilting angle as the second hinge part 220. That is, a user can easily move the display device 100 while preventing the display device 100 from rotating on its axis.

The structure and operation of the second two-link hinge unit 300 will now be described in detail.

The second two-link hinge unit 300 includes a third hinge part 310 rotatably coupled to the tilting connection unit 400, a fourth hinge part 320 rotatably coupled to the base unit, and a left connecting component 330 and a right connecting component 340 that are rotatably connected between the third hinge part 310 and the fourth hinge part 320.

In detail, referring to FIG. 4, the third hinge part 310 includes a third hinge shaft 301 having cylindrical portions which are different in diameter, and the fourth hinge part 320 includes a fourth hinge shaft 302 having a cylindrical shape. The left connecting component 330 includes a link part. The link part includes a connecting rod 331, a third link 332, and a fourth link 333 that are elongated in up and down directions. When viewed in FIG. 4, the third hinge shaft 301 includes a connecting rod receiving portion 311, a third link receiving portion 312, and a fourth link receiving portion 313 that are recessed in an outer surface of a left portion of the third hinge shaft 301 in a radial direction for receiving one end of the connecting rod 331, the third link 332, and the fourth link 333.

The third hinge shaft 301 further includes a third link coupling hole 31b and a fourth link coupling hole 31a in a left side. The third and fourth link coupling holes 31b and 31a are located at some distance from the center of the third hinge shaft 301, such that the third link 332 and the fourth link 333 can be rotated on different rotation centers. The third hinge shaft 301 includes a small diameter portion 315 around which third hinge spring members 315a, 315b, and 315c are fitted. The third hinge spring member 315a is a stopper having alternating protruded portions and recessed portions on an outer circumference. The third hinge spring member 315b is a spring for allowing tilting motion. The third hinge spring member 315c is a nut for fixing the stopper 315a and the spring 315b. The third hinge spring members 315a, 315b, and 315c include through-holes, respectively, for receiving the small diameter portion 315 of the third hinge shaft 301. The third hinge shaft 301 includes a center portion 318 having a relatively large diameter. A third friction spring 319 having a hollow shape and outwardly protruded stopping jaw is fitted around the center portion 318 for hinge-coupling between the third hinge shaft 301 and the first two-link hinge unit 200 fixed to the rear surface of the display device.

The fourth hinge shaft 302 includes a connecting rod receiving portion 321, a third link receiving portion 322, and a fourth link receiving portion 323 that are recessed in an outer surface of a left portion of the fourth hinge shaft 302 in a radial direction for receiving the other ends of the connecting rod 331, the third link 332, and the fourth link 333. The fourth hinge shaft 302 further includes a third link coupling hole 32b and a fourth link coupling hole 32a in a left side. The third and fourth link coupling holes 32b and 32a are located at different distances from the center of the fourth hinge shaft 302, such that the third link 332 and the fourth link 333 can be rotated on different rotation centers. The fourth hinge shaft 302 includes a center portion 325, and a fourth friction spring 326 having a hollow shape and outwardly protruded stopping jaw is fitted around the center portion 325 for hinge-coupling between the fourth hinge shaft 302 and the base fixing portion 510 upwardly protruded from the base unit 500.

The connecting rod 331 includes hinge shaft coupling grooves 331a and 331b on both ends for coupling with the third hinge shaft 301 and the fourth hinge shaft 302, respectively. The connecting rod receiving portions 311 and 321 of the third and fourth hinge shafts 301 and 302 are fitted into the hinge shaft coupling grooves 331a and 331b, respectively. The third link 332 includes end portions narrower than a center portion, and third link through-holes 332b and 332a in center areas of the narrower end portions. The fourth link 333 includes end portions narrower than a center portion, and fourth link through-holes 333a and 333b in center areas of the narrower end portions. One end of the third link 332 and the fourth link 333 are respectively inserted into the third link receiving portion 312 and the fourth link receiving portion 313 that are formed in the left portion of the third hinge shaft 301. Then, after aligning the third link through-hole 332a of the third link 332 with the third link coupling hole 31b and aligning the fourth link through-hole 333a with the fourth link coupling hole 31a, coupling pins 338a and 338b are inserted, such that the third link 332 and the fourth link 333 can be rotatably fixed to the third hinge shaft 301. The other ends of the third link-332 and the fourth link 333 are respectively inserted into the third link receiving portion 322 and the fourth link receiving portion 323 that are formed in the left portion of the fourth hinge shaft 302. Then, after aligning the third link through-hole 332b of the third link 332 with the third link coupling hole 32b and aligning the fourth link through-hole 333b with the fourth link coupling hole 32a, coupling pins 338c and 338d are inserted, such that the third link 332 and the fourth link 333 can be rotatably fixed to the fourth hinge shaft 302.

Meanwhile, the right connecting component 340 is provided as a supporting part for stable operation of the second two-link hinge unit 300. The right connecting component 340 may be rotatably fixed to the third hinge shaft 301 and the fourth hinge shaft 302 for moving according to the movement of the left connecting component 330. A general connecting member can be used for the left connecting component 340. Thus, detail description of the left connecting member 340 will be omitted.

With the above-described configuration, the second two-link hinge unit 300 is rotatable on the third hinge shaft 301 of the third hinge part 310 and on the fourth hinge shaft 302 of the fourth hinge part 320, such that the display device can be adjusted in a front-to-back direction and a vertical direction. Further, the second two-link hinge unit 300 includes the third hinge part 310, the fourth hinge part 320, the third link 332, and the fourth link 333 that are linked with each other as a four-bar linkage, namely quadric crank mechanism. Therefore, when a force is applied to the display device 100, the third hinge part 310 is moved in parallel with the fourth hinge part 320. Owing to this configuration, the tilting angle of the display device 100 is not changed when the display device 100 is moved in front-to-back direction and a vertical direction, so that users can conveniently adjust the position of the display device 100 in a front-to-back direction and a vertical direction. The structure and operation of the second two-link hinge unit 200 may be understood in correspondence with those of the first two-link hinge unit 200.

Meanwhile, the friction between fourth hinge shaft 302 and the base fixing portion 510 can be smaller than the friction between third hinge shaft 301 and the third friction spring 319. In this case, when the position of the display device 100 is adjusted in front-to-back, vertical directions and the tilting angle of display device screen, the position of the display device 100 can be easily adjusted prior to adjusting the tilting angle of the display device 100. On the contrary, if the friction between fourth hinge shaft 302 and the base fixing portion 510 is adjusted to be larger than the friction between third hinge shaft 301 and the third friction spring 319, the tilting angle of the display device 100 can be easily adjusted prior to adjusting the position of the display device 100.

Figure 5:
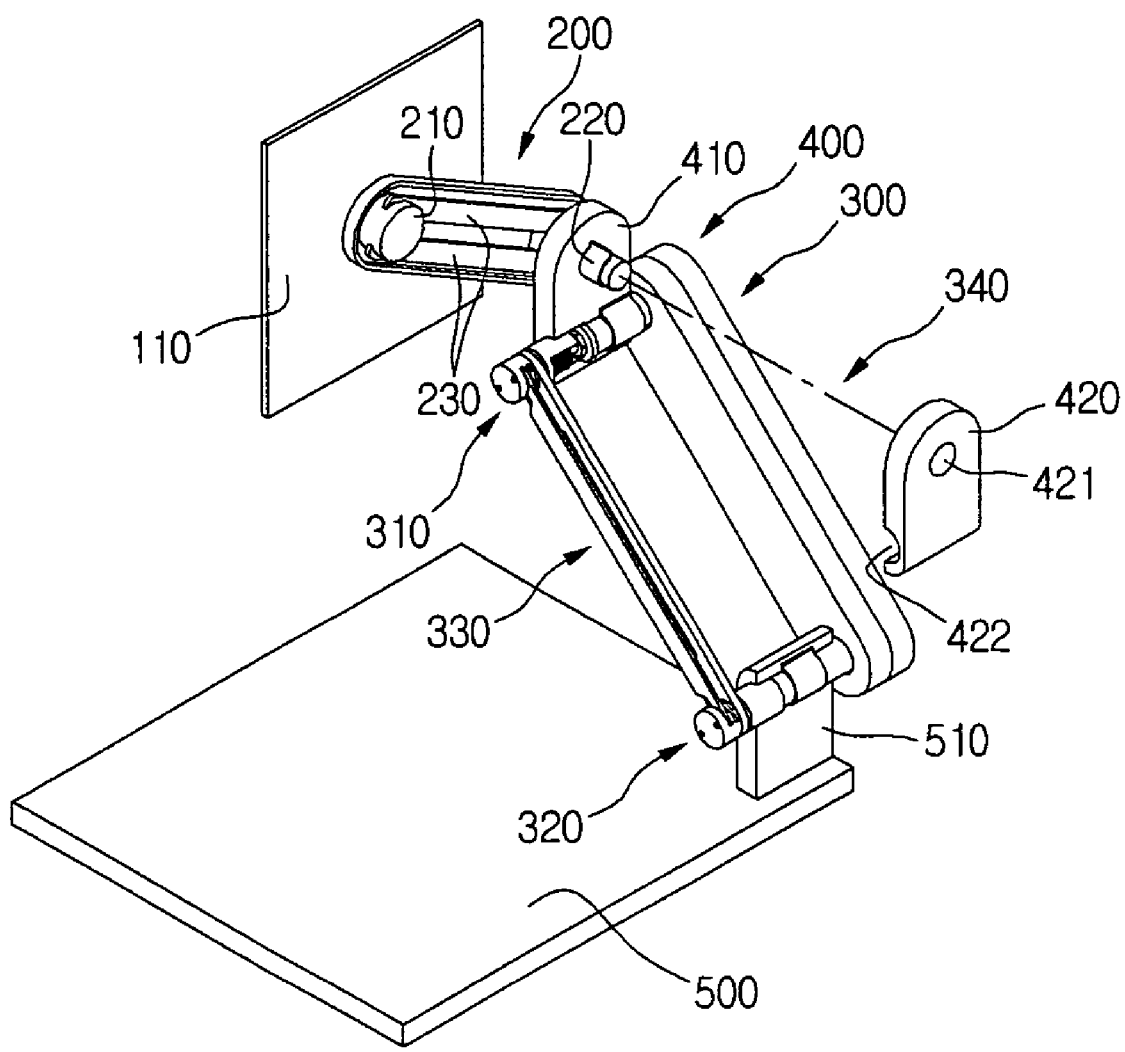
FIG. 5 illustrates coupling of the first hinge unit depicted in FIG. 3 and the second hinge unit depicted in FIG. 4.

The first two-link hinge unit 200 and the second two-link hinge unit 300 are connected with each other using the tilting connection unit 400 as shown in FIG. 5.

FIG. 5 illustrates coupling of the first two-link hinge unit 200 and the second hinge unit 300.

Referring to FIG. 5, the tilting connection unit 400 includes connecting members 410 and 420. The connecting members 410 and 420 are shaped in correspondence with the second friction spring 225 (refer to FIG. 3) that is fitted around the extension 224 of the second hinge shaft 221 of the first two-link hinge unit 200, and the third friction spring 319 (refer to FIG. 4) that is fitted around the third hinge shaft 301.

The connecting members 410 and 420 includes a second friction spring receiving portion 421 for tightly receiving the second friction spring 225, and a third friction spring receiving portion 422 for tightly receiving the third friction spring 319. That is, the second and third friction springs 225 and 319 are tightly fitted into the second friction spring receiving portion 421 and the third friction spring receiving portion 422, respectively.

In the tilting connection unit 400, when a force acting on the display device 100 is larger than frictional forces between the second friction spring 225 and the second hinge shaft 221 and between the third friction spring 319 and the third hinge shaft 301, the force acting on the display device 100 is transmitted to the tilting connection unit 400 via the stopping jaws protruded from the friction springs 225 and 319. Therefore, the display device 100 can be rotated about the third hinge shaft 301 and extension 224, so that the tilting angle and revolution position of the display device screen can be adjusted.

Figure 6:
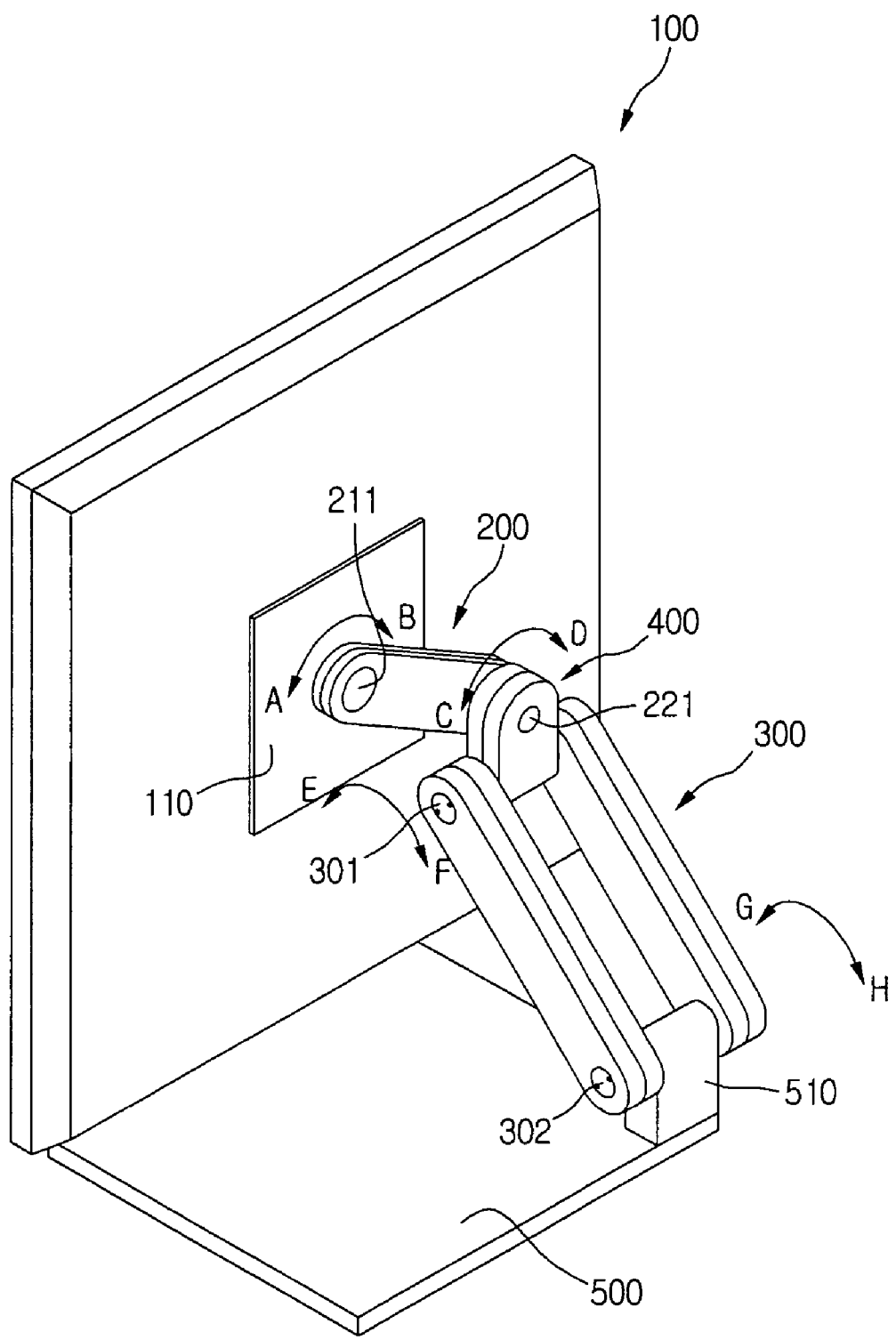
FIG. 6 illustrates an operation of a stand of a display device according to the present invention.

FIG. 6 illustrates an operation of the stand of the display device according to the present invention.

Referring to FIG. 6, in the stand of the display device 100, when the length directions of the first two-link hinge unit 200 and the second two-link hinge unit 300 are perpendicular to a floor, the display device 100 is placed at the highest position in front of a user.

When a user wants to lower the display device 100 from the highest position, the user can moves down the display device 100. If the display device receives a force in a downward direction, the left link 231 and the right link 235 of the first two-link hinge unit 200 are rotated on the second hinge shaft 221 in direction C or D, or the left connecting component 330 of the second two-link hinge unit 300 is rotated on the fourth hinge shaft 302 in direction G.

In this case, the rotation order of the elements of the stand is determined by the friction between the second hinge shaft 221 of the first two-link hinge unit 200 and the second friction spring 225 fitted around the second hinge shaft 221, and by the friction between the fourth hinge shaft 302 of the second two-link hinge unit 300 and the base fixing portion 510 to which the fourth hinge shaft 302 is rotatably fixed. If the frictional force between the second hinge shaft 221 of the first two-link hinge unit 200 and the second friction spring 225 is smaller than the frictional force between the fourth hinge shaft 302 of the second two-link hinge unit 300 and the base fixing portion 510, the left link 231 and the right link 235 of the first two-link hinge unit 200 are rotated on the second hinge shaft 221 in direction C or D, and thereby lowering the display device 100. In the opposition case, the left connecting component 330 of the second two-link hinge unit 300 is rotated on the fourth hinge shaft 302 in direction G, thereby lowering the display device.

When a user wants to move the screen of the display device 100 left or right, the user can move the display device 100. In this case, the first hinge shaft 211 and the second hinge shaft 221 of the first two-link hinge unit 200 are rotated by a force acting on the display device 100. However, the third hinge shaft 301 and the fourth hinge shaft 302 of the second two-link hinge unit 300 are not rotated since the force is exerted on the display device 100 in a length direction of the third and fourth hinge shafts 301 and 302. Therefore, the display device 100 can be moved left or right by rotation of the right link 235 and the left link 231 of the first two-link hinge unit 200 in direction C or D.

Meanwhile, when a user wants to tilt the display device 100, the user can apply a force to the display device 100 from an upper or lower portion of the display device 100. In this case, the first hinge shaft 211 and the second hinge shaft 221 of the first two-link hinge unit 200 are not rotated since they receive the force in a length direction. On the contrary, the third hinge shaft 301 and the fourth hinge shaft 302 of the second two-link hinge unit 300 are rotated by the force.

Frictional forces acting on the third hinge shaft 301 and the fourth hinge shaft 302 determines whether the display device 100 is rotated about the third hinge shaft 301 or the fourth hinge shaft 302.

In this configuration of the stand for adjusting the position of the display device 100 in front-to-back and vertical directions and the tilting angle of display device screen, if the friction between fourth hinge shaft 302 and the base fixing portion 510 is adjusted to be smaller than the friction between third hinge shaft 301 and the third friction spring 319, the position of the display device 100 may be adjusted in the front-to-back and vertical directions before the tilting angle of the display device screen is adjusted since the display device 100 can be more easily rotated about the fourth hinge shaft 302 in direction G or H than about the third hinge shaft 301 in direction E or F. On the contrary, if the friction between fourth hinge shaft 302 and the base fixing portion 510 is adjusted to be larger than the friction between third hinge shaft 301 and the third friction spring 319, the tilting angle of the display device 100 may be adjusted before the position of the display device 100 is adjusted since the display device 100 can be more easily rotated about the third hinge shaft 301 in direction E or F than about the fourth hinge shaft 302 in direction G or H.

According to the rotation of the display device, the distance between a user and an upper portion of the display device 100 increases or decreases, such that the screen of the display device 100 can be tilted to a desired angle.

In another embodiment of the present invention, the positions of the first two-link hinge unit and the second two-link hinge unit may be interchanged. In other words, the first two-link hinge unit can be positioned under the second two-link hinge unit. In this case, although downward rotation of the first two-link hinge unit is restricted, the display device can be translated/rotated in the same degrees-of-freedom.

Although the tilting connection unit is connected between the first two-link hinge unit and the second two-link hinge unit, the present invention is not limited to this configuration. For example, the tilting connection unit can be connected to a lower portion of the second two-link hinge unit.

Further, all or any one of the two-link hinge units 200, 300 can be omitted as a another embodiment, in this case, even though the tilting angle or screen position of the display device can be changed during adjusting the position of the screen, the operation of the stand, which is according to the inventive thought, can be realized.

According the stand of the present invention, the first two-link hinge unit allows adjustment of the display device in left, right, up, and down directions, and the second two-link hinge unit allow adjustment of the display device in front, back, up, and down directions.

Further, the tilting connection unit connected between the first and second two-link hinge units allows the screen of the display device to be adjusted to a desired tilting angle.

Furthermore, since the stand of the present invention is provided with multiple four-bar linkage structures, the angle of the display device is not readily changed after it is adjusted. Therefore, since the angle of the display device is not readily changed, the height/position of the display device can be easily adjusted by applying a force to the display device. If a user wants to change the angle of the display device, the angle of the display device can be easily changed by applying a relatively large force to the display device in a predetermined direction.

In addition, according to the stand of the present invention, the position of the display device can be adjusted in front, back, left, right, up and down directions and at the same time the tilting angle of the display device can be adjusted.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stand of a display device, comprising:
    a base;
    a supporting device connected to the display device;
    a first two-link hinge device provided between the base and the supporting device that allows revolution of the display device around a first imaginary axis that extends perpendicular to a rear surface of the display device;
    a second two-link hinge device provided between the base and the supporting device that allows revolution of the display device around a second imaginary axis that extends perpendicular to the first imaginary axis; and
    a tilting connection device that connects the first two-link hinge device to the second two-link hinge device, wherein the first two-link hinge device is rotatably coupled to the tilting connection device with respect to a third imaginary axis that extends parallel to the first imaginary axis.

2. The stand according to claim 1, wherein the first two-link hinge device comprises an end coupled to the supporting device.

3. The stand according to claim 1, wherein the second two-link hinge device comprises an end coupled to the base.

4. The stand according to claim 1, wherein the first two-link hinge device comprises a lower portion coupled to an upper portion of the second two-link hinge device.

5. The stand according to claim 1, wherein each of the first and the second two-link hinge devices comprises a four-bar linkage structure.

6. The stand according to claim 1, wherein one of the first and the second two-link hinge devices is connected to a corner of the base.

7. The stand according to claim 1, wherein the second two-link hinge device comprises a lower end connected to a corner of the base.

8. A stand of a display device, comprising:
    a base;
    a supporting device connected to the display device;
    a first link hinge device having an end rotatably connected to the supporting device that allows adjustment of the display device in left, right, up, and down directions;
    a second link hinge device having one end rotatably connected to the first link hinge device and the other end rotatably connected to the base; and
    a tilting connection device connected between the first and the second link hinge devices that allows rotation of display device around a first imaginary axis that extends perpendicular to a rear surface of the display device and rotation of display device around a second imaginary axis that extends perpendicular to the first imaginary axis, wherein the tilting connection device allows rotation of the first link hinge device around a third imaginary axis that extends parallel to the first imaginary axis.

9. The stand according to claim 8, wherein the second link hinge device is coupled to a corner of the base.

10. The stand according to claim 8, wherein the first link hinge device comprises:
- a first hinge part hinged on the supporting device;
- a second hinge part hinged on one end of the second link hinge device; and
- a link part that rotatably connects the first hinge part and the second hinge part.

11. The stand according to claim 10, wherein the link part comprises a pair of links each eccentrically connected between the first and the second hinge parts to form a four-bar linkage.

12. The stand according to claim 10, wherein the second hinge part comprises a hinge shaft and an extension extended from the hinge shaft in a backward direction of the display device, the extension being rotatable with respect to the second link hinge device.

13. The stand according to claim 8, wherein the second two-link hinge device comprises:
- a third hinge part including a third hinge shaft hinged on the first two-link hinge device;
- a fourth hinge part including a fourth hinge shaft hinged on the base; and
- a link part rotatably connecting the third and the fourth hinge parts.

14. The stand according to claim 13, wherein the link part comprises a pair of links each eccentrically connected between the third and the fourth hinge parts to form a four-bar linkage.

15. A stand of a display device, comprising:
- a base;
- a first two-link hinge device provided with a four-bar linkage structure and having an end connected to the display device, that allows adjustment of the display device in left, right, up, and down directions;
- a second two-link hinge device provided with a four-bar linkage structure and having an end connected to the base, that allows adjustment of the display device in front, back, up, and down directions; and
- a tilting connection device connected between the first and the second two-link hinge devices that allows adjustment of the display device to a desired tilting angle, wherein, the tilting connection allows rotation of display device around imaginary axis perpendicular to the display device and rotation of display device imaginary axis parallel to the display device.

16. The stand according to claim 15, wherein the tilting connection device is connected between the first and the second two-link hinge devices using friction members.

17. The stand according to claim 15, wherein the first two-link hinge device is connected to the display device using a rotation hinge.

\* \* \* \* \*